United States Patent [19]
Roerig

[11] Patent Number: 5,749,590
[45] Date of Patent: May 12, 1998

[54] SUSPENSION FORK ASSEMBLY

[76] Inventor: Scott Roerig, 13888 Clear Creek Dr., Lowell, Mich. 49331

[21] Appl. No.: 502,188

[22] Filed: Jul. 13, 1995

[51] Int. Cl.$^6$ ................................................ B62K 25/08
[52] U.S. Cl. ................................................ 280/276
[58] Field of Search ........................... 280/276, 277, 280/275, 283

[56] References Cited

U.S. PATENT DOCUMENTS

| | | | |
|---|---|---|---|
| 423,471 | 3/1890 | Easthope | 280/276 |
| 783,236 | 2/1905 | Ashburn | 280/276 |
| 1,605,680 | 11/1926 | Merkel | 280/276 |
| 1,834,308 | 12/1931 | Harley | 280/276 |
| 2,511,320 | 6/1950 | Benson | 280/279 |
| 2,540,585 | 2/1951 | Kranz | 280/276 |
| 2,543,991 | 3/1951 | Schuricht | 280/276 |
| 4,268,055 | 5/1981 | Bell | 280/278 |
| 4,735,276 | 4/1988 | Burton | 180/219 |
| 4,834,412 | 5/1989 | Trema | 280/276 |
| 5,299,820 | 4/1994 | Lawwill | 280/277 |
| 5,308,099 | 5/1994 | Browning | 280/276 |
| 5,320,374 | 6/1994 | Farris et al. | 280/276 |
| 5,359,910 | 11/1994 | Chang et al. | 74/551.2 |
| 5,380,026 | 1/1995 | Robinson | 280/279 |
| 5,462,302 | 10/1995 | Leitner | 280/277 |

*Primary Examiner*—Kevin Hurley
*Attorney, Agent, or Firm*—Waters & Morse, P.C.

[57] ABSTRACT

A front suspension fork assembly for a bicycle comprises a hollow head tube with an enlarged lower end, and a hollow steerer tube with an enlarged lower end rotatably mounted in the head tube by aircraft-type bearings. A standard high performance mountain bike shock absorber is mounted internally in the lower end of the steerer tube. A standard steerer stem is mounted on the top of the steerer tube. A front fork comprising a pair of parallel fork arms interconnected by cross members is mounted to the steerer tube by a four link pivoting mounting mechanism. The mounting mechanism comprises an upper and lower link mechanism mounted to the steerer tube above and below the head tube. Each link mechanism comprises a pair of laterally spaced pivot links pivotally attached at rear ends to pivot link brackets attached to the steerer tube. The pivot links extend forwardly to forward ends, which are pivotally attached to the fork at longitudinally adjustable positions on the fork. The lower pivot link actuates the shock absorber as the fork reciprocates up and down. A steering stop prevents excess rotation of the steerer tube.

16 Claims, 4 Drawing Sheets

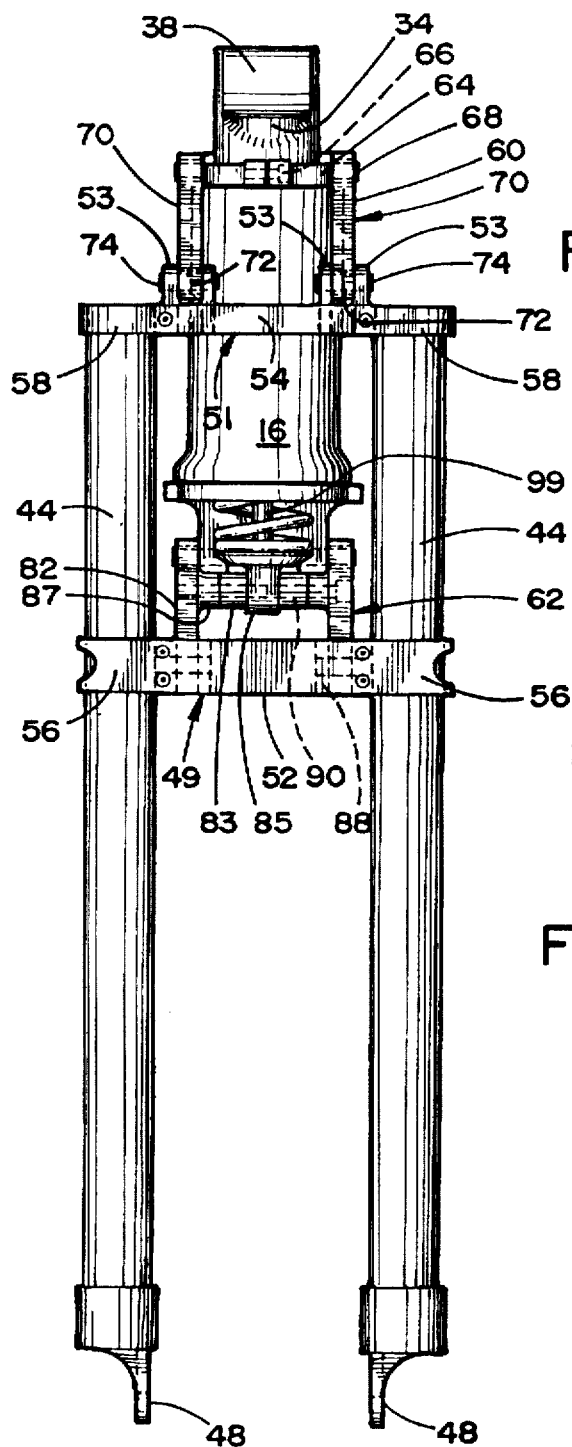
Fig. 3
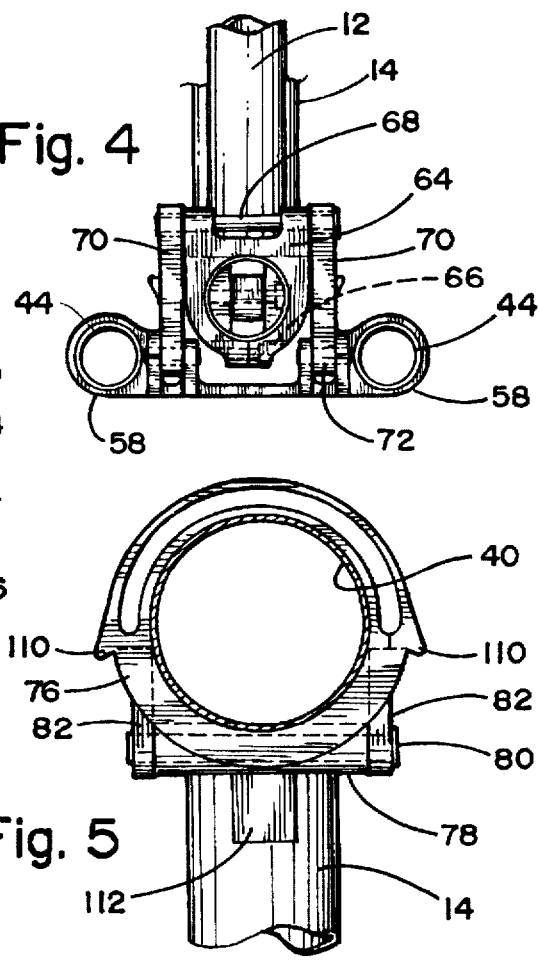
Fig. 4
Fig. 5
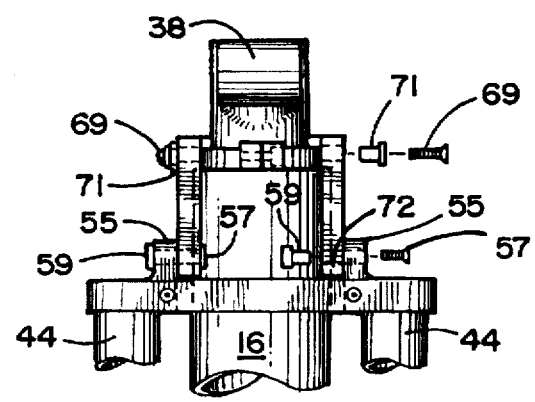
Fig. 6

SUSPENSION FORK ASSEMBLY

FIELD OF THE INVENTION

The present invention relates to a suspension fork assembly for a bicycle or motorcycle wherein the suspension mechanism is contained internally in the steerer tube and is actuated by a multiple link pivot mounting mechanism.

BACKGROUND OF THE INVENTION

While front and rear suspension systems are commonly employed in motorcycles, suspension systems are less commonly employed in bicycles. In bicycles used on hard road surfaces, wheels are generally mounted rigidly to the frame, without any suspension system. Off-road bicycles, commonly known as mountain bikes, sometimes do employ suspension systems. Such bikes may use suspension systems for either or both the rear wheel and the front wheel.

Suspension systems in bicycles usually are called "shock absorbers" even though they may include both a spring and an energy dissipating or shock absorbing unit. The term "shock absorber" will be used herein to mean a suspension system or resilient biasing mechanism that includes either or both a spring or resilient element and an energy dissipating element.

While almost any suspension mechanism could be employed to provide control to the front end of a bicycle, unique problems arise in designing a front wheel suspension system for a high performance bike of the type that is used for racing, wherein optimum performance and lateral stability are desired over a rugged and demanding terrain. In one known system, a bicycle fork is mounted forwardly from the head tube of the bicycle by a pivot linkage that includes a compressible shock absorber mounted between the head tube and the fork. This system provides a durable shock absorber, but in order to achieve this benefit, it is necessary to position the fork of the bicycle forwardly from the head tube. This alters the dynamics of the bicycle and requires that a rear offset drop out be used to attach the wheel to the fork legs. This gives a heavy feel to the front end when steering. Also, in such a system, the shock absorber is attached to the steerer stem. This is undesirable because a special steerer stem is required, and this involves additional expense. This is also undesirable because a steerer stem is a relatively light weight component and can break when subjected to impact forces transferred from the shock absorber. In addition, the shock absorber is mounted in an exposed position where dirt and dust and physical abrasion can damage the unit.

In another type of mountain bike incorporating a front suspension system, a compressible rubber or air shock absorber is mounted in the head tube itself between the fork and the head tube. This provides a limited stroke and the bike must use a specific designed shock absorber. This type of suspension system is protected from the elements but is severely limited in its shock absorbing characteristics. The shock absorber also tends to stick or resist movement under light forces (a condition known as "stiction"), which makes performance less desirable.

An object of the present invention is to provide an improved front fork suspension system for a high performance mountain bicycle wherein a conventional high performance shock absorber is incorporated inside the steerer tube of the bicycle and wherein the fork is connected to the frame by a high strength pivoting mounting mechanism.

SUMMARY OF THE INVENTION

In accordance with the present invention, a front fork assembly for a bicycle or motorcycle or the like having a frame comprises a hollow head tube mounted on a front end of the frame in a generally upright position. A hollow steerer tube is rotatably mounted in the head tube and includes upper and lower ends that extend out of the top and bottom ends of the head tubes. An elongated resilient biasing mechanism, preferably a conventional high capacity shock absorber (which desirably is a combination spring and shock absorber assembly), is positioned in the steerer tube and mounted at an upper end to an upper portion of the steerer tube. The spring assembly has a lower end that extends out of the lower end of the steerer tube. A fork assembly comprising a pair of parallel arms interconnected by cross members at an upper portion thereof is pivotally mounted to the steerer tube by means of upper and lower pivot link mechanisms attached to upper and lower ends of the steerer tube, with each pivot link mechanism comprising a pair of pivot links spaced laterally apart, thus providing a stable four pivot link mounting mechanism with eight pivot points. The pivot links are attached to the fork by longitudinally adjustable clamps called fork tube double clamps. The clamp positions can be adjusted to adjust the longitudinal position of the front wheel during vertical reciprocation of the wheel.

One of the important features of the invention is that the steerer and head tubes have enlarged lower ends and accommodate a standard high performance mountain bike rear shock absorber in the steerer tube. The use of a standard shock absorber provides more choices of high quality components at lower prices that systems requiring special or custom shock absorbers. When mounted in this position the shock absorber is protected from abrasion and dirt and makes it possible to mount the fork assembly rearwardly in substantial alignment with the head tube. The four mounting links provide good lateral stability.

These and other features of the invention are described or apparent in the description of the exemplary embodiment set forth below and shown in the appended drawings.

BRIEF DESCRIPTION OF THE DRAWINGS

FIG. 3 is a front view of the fork assembly of the present invention, with the handlebar removed.

FIG. 4 is an axial end view taken from the top of the fork assembly of the present invention.

FIG. 5 is a sectional view taken along line 5—5 of FIG. 1.

FIG. 6 is a partial view as in FIG. 3 showing a modified version of the pivot link attachment mechanism.

DETAILED DESCRIPTION OF PREFERRED EMBODIMENT

Figure 1:
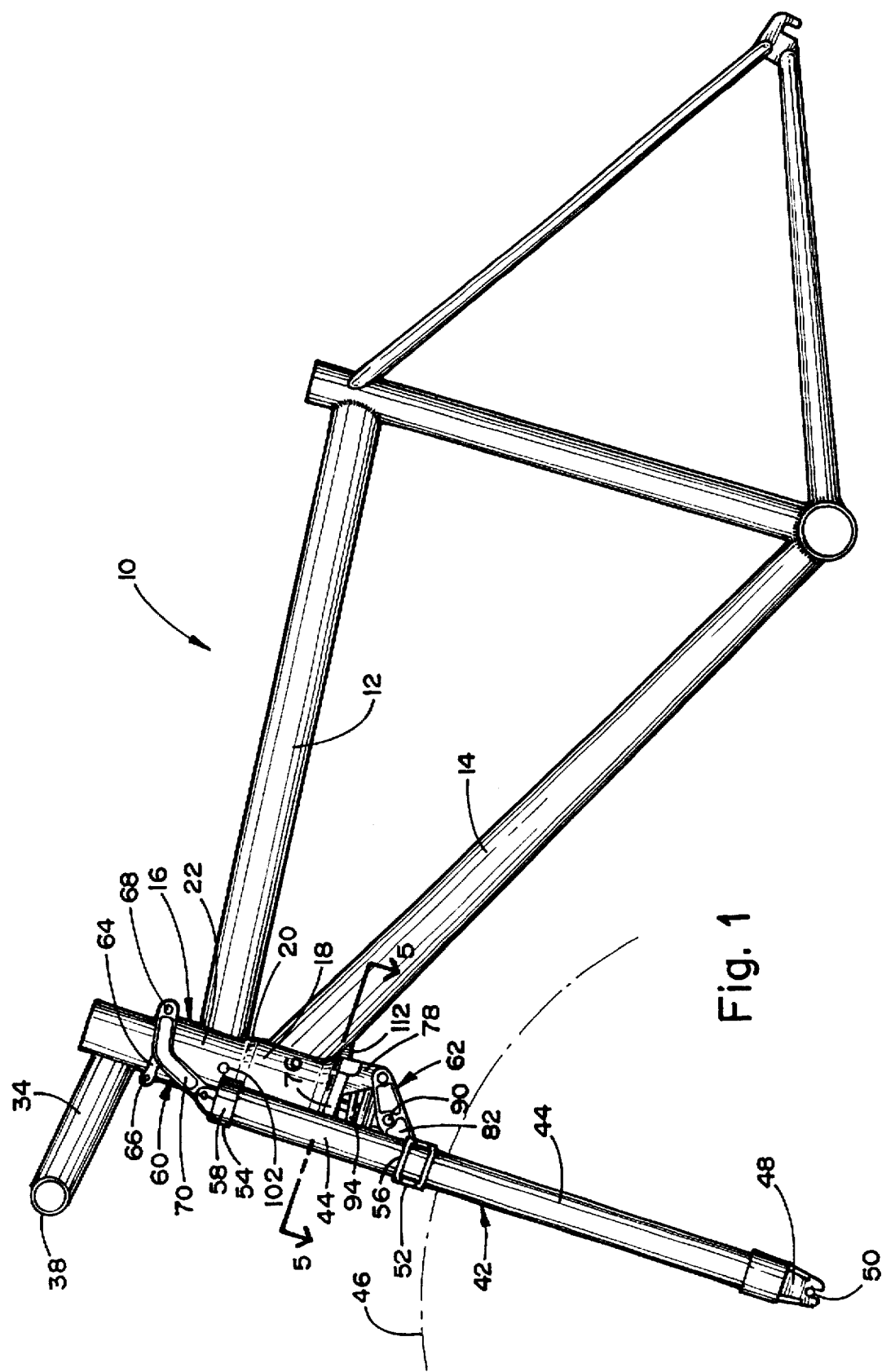
FIG. 1 is a side elevational view of a bike frame employing the fork assembly of the present invention.
Figure 2:
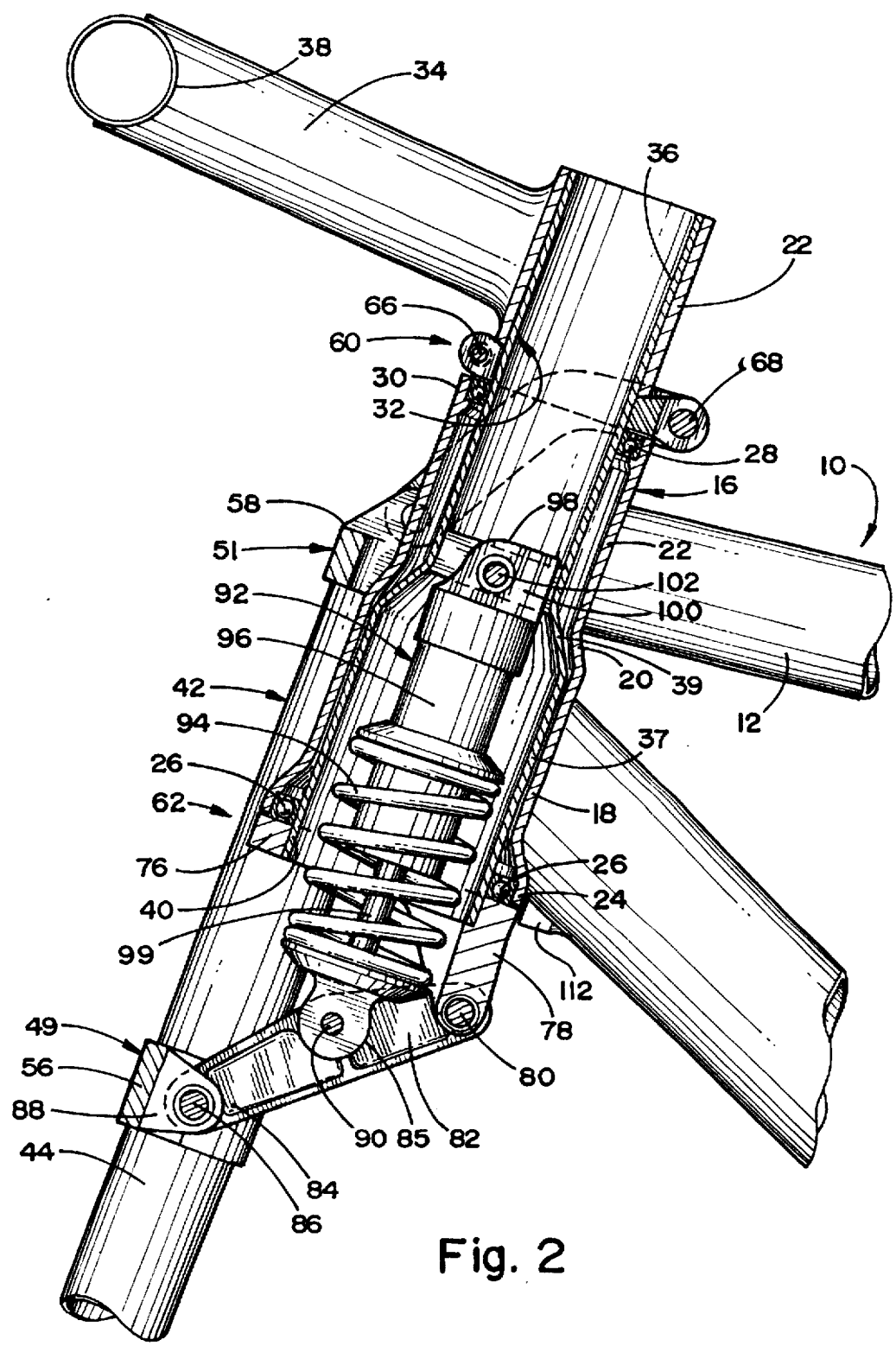
FIG. 2 is an enlarged partial side elevational sectional view of the assembly of FIG. 1, showing the head tube portion of the fork assembly.

Referring now to the drawings, bicycle frame 10 comprises horizontal and inclined frame tubes 12 and 14 which are welded, bonded, or otherwise joined at front ends thereof to a generally upright head tube 16. Head tube 16 is inclined rearwardly at a slight angle as is conventional practice in bicycle manufacture. Head tube 16 is substantially larger in diameter than a conventional head tube in a bicycle and includes an enlarged lower end 18, a tapered midsection 20 and a smaller diameter upper portion 22. A flared lower end 24 houses an aircraft type of ball bearing 26. A similar bearing 28 is mounted in an upper end 30 of the head tube. The bearings are press fitted into the ends of the head tube. The sidewall of the head tube between the bearings at the ends can be open, if desired. In such a case, the head tube would simply comprise a rotatable support mechanism. Also, spaced bearings mounted at the front of a frame that support the steerer tube could be used instead of a conventional head tube. The use of the term "head tube" herein includes these constructions.

A steerer tube 32 is mounted in the bearings 26 and 28 inside the head tube for rotation with respect to the head tube. A conventional steerer stem 34 is mounted on an upper portion 36 of the steerer tube that extends above the upper end 30 of the head tube. Steerer tube 32 has an enlarged lower portion 37, conically tapered midportion 39, and the upper portion 36. Conventional handle bar mechanism 38 is mounted on the steerer stem. The lower end 40 of the steerer tube extends downwardly past the end 24 of the head tube. The reduced diameter upper portion of the steerer tube makes it possible to attach a conventional handle bar steerer stem to the steerer tube.

The bicycle fork assembly includes a front fork 42 comprising a pair of tubular fork arms 44 that extend downwardly on opposite sides of a wheel 46 to fittings 48 (generally called "drop outs") that attach to the opposite ends of the axle 50 of the wheel. Tubular arms 44 are interconnected at an upper portions thereof by double clamp mechanisms 51 and 49 respectively (FIG. 3). These clamp mechanisms comprise a lower cross member 52 and an upper cross member 54. The cross members are connected to the tubes by lower and upper slider clamps 56 and 58 mounted at the ends of the cross members. The slider clamps can be tightened by bolts or other threaded fasteners to secure the cross members at any desired longitudinal position along fork tubes 44.

Clamps 49 and 51 can have different constructions, as shown in FIG. 3. Alternatively, the same clamp can be used in both places. Desirably, upper clamp 51 can be used for the lower clamp, in which case clamp 51 is preferably turned upside down when used for the bottom clamp.

The fork 42 is attached to the steerer tube 32 by a pivoting link mounting mechanism comprising an upper link mechanism 60 and a lower link mechanism 62. Upper link mechanism comprises a upper link bracket 64 attached to the steerer tube by a threaded fastener 66 that tightens the bracket securely in place on the upper portion of the steerer tube. A transverse pivot pin 68 (FIGS. 3 and 4) is mounted to a rear end of the upper link bracket, with upper pivot links 70 being pivotally mounted at rear ends on pivot pin 68 on opposite sides of the steerer tube and extending forwardly to front ends 72. Alternatively, separate pivot fastener screws 69 and tubular nuts 71 could be employed on each side of the upper link bracket for each link (FIG. 6). Front ends 72 are pivotally mounted on flanges 53 on cross members 54 by bearing mounted pivot pins 74 (FIGS. 3 and 4). Alternatively, the structure can include only a thicker outer flange 55 and can employ threaded fasteners 57 and tubular nuts 59 (FIG. 6) to mount the links on the link mechanism.

Lower link mechanism 62 comprises a lower link bracket 76 in the form of a collar welded or otherwise fastened to the bottom end 40 of the steerer tube. Collar 76 abuts the lower end of the head tube and bearing 26 and limits the upper movement of the steerer tube into the head tube.

A downwardly extending pivot link mount 78 extends downwardly from a rear portion of the collar 76, and a transverse pivot pin 80 extends through the lower end of the mount. A pair of lower pivot links 82 are pivotally mounted at rear ends thereof to pivot pin 80 on opposite sides of the steerer tube. The front ends 84 of the pivot links are attached by bearing mounted pivot pins 86 to flanges 88 attached to cross members 52. A fastener 90 in the form of a socket head cap screw interconnects the lower pivot links 82 at an intermediate position adjacent the lower end of steerer tube 32. Bosses 83 on lower flange 85 of the shock absorber 92 fit closely between bosses 87 on links 82.

With the enlarged lower portion of head tube 16 and the enlarged lower portion of steerer tube 32, a standard self-contained high performance shock absorber 92 can be incorporated internally in the steerer tube. At the same time, a standard steerer stem will fit on the reduced diameter upper end of the steerer tube. This provides an advantage over some other systems that will not accept a standard steerer stem.

A number of high quality and high performance shock absorbers or suspension units have been developed for rear suspension systems of bicycles, where space restrictions are not a problem. An important feature of the present invention is that a high performance suspension unit of the type that is used for rear suspensions in mountain bikes can be used for the front suspension system of the present invention. Suspension member or shock absorber 92 includes a spring 94 concentrically mounted on a piston type shock absorber 96. An upper end 98 of the shock absorber is attached to flanges 100 mounted on the interior of the steerer tube by means of a bolt 102. Flange 85 on the lower end of the reciprocating piston shaft 99 of the shock absorber is attached to the links 82 by bolt or screw 90.

Figure 8:
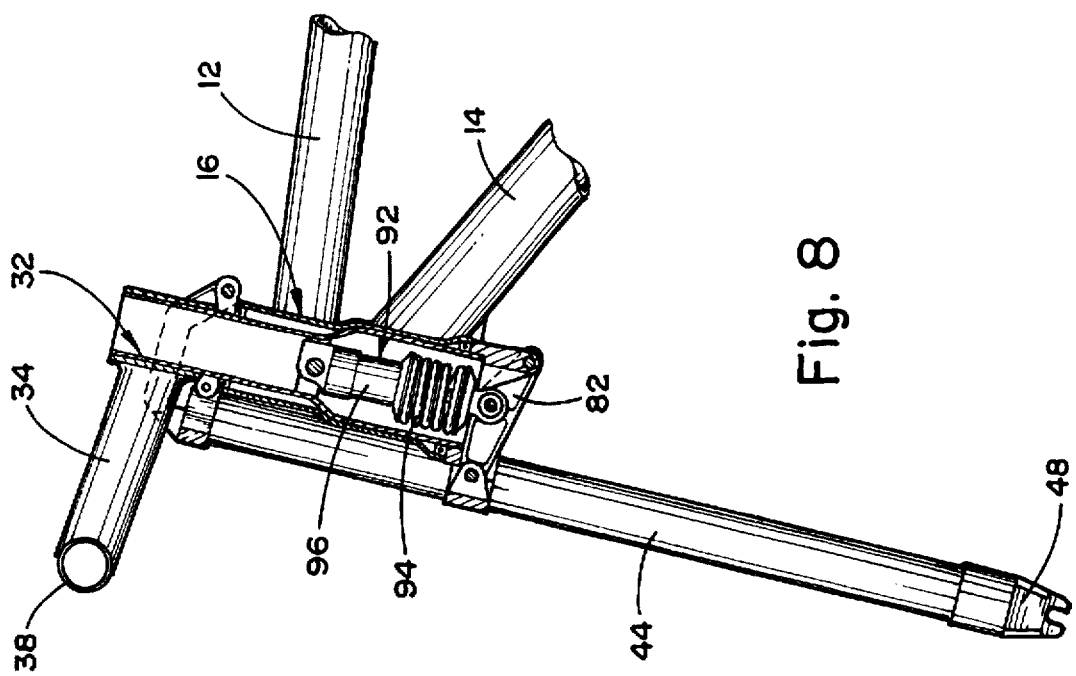
FIG. 8 is a view as in FIG. 7 showing the fork assembly in a compressed condition.
Figure 7:
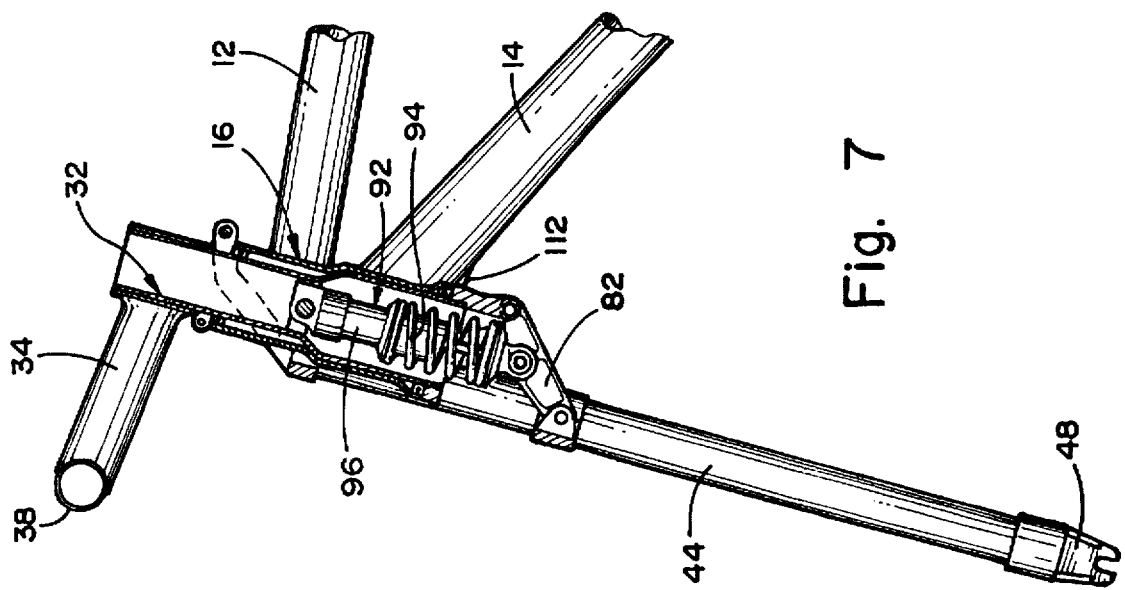
FIG. 7 is a partially sectional side elevational view showing the fork assembly in a non-compressed condition.

In operation, when road conditions urge the bicycle wheel 46 to reciprocate up and down (FIGS. 7 and 8), the fork urges upper and lower pivot links 70 and 82 to pivot upwardly and downwardly in substantially parallel fashion. The upward movement of pivot links 82 from the position in FIG. 7 to the position in FIG. 8 actuates suspension member 92 and causes compression of the spring and actuation of the shock absorber. Because the pivot links serve as levers and the fork is positioned further from the pivot axis than the shock absorber, the fork can have a longer stroke than the shock absorber. This mechanical advantage improves the cushioning characteristics of the system and makes it possible to use a smaller and lighter shock absorber.

There are a number of features of the present invention that provide for improved performance. As shown in the figures, the fork tubes are positioned rearwardly almost to the position of the axis of the steerer tube. This avoids the undesirable attribute of prior systems wherein it has been necessary to mount the fork assembly substantially in front of the head tube in order to incorporate a suspension member. Performance characteristics are improved markedly by positioning the fork substantially at the position of the head tube.

Another significant feature of the invention is that the double clamps on the fork tubes are adjustable in position. This adjustment can facilitate fine tuning of the suspension system and fork mechanism in the bicycle. With an ordinary suspension system without adjustment capabilities, because the head tube is mounted at an inclined angle with respect to the frame, upward reciprocation of the fork in the head tube causes the front wheel to move rearwardly in addition to moving upwardly. The rearward movement of the front wheel upon compression of the suspension system can decrease the wheel base by as much as 0.850 inches at maximum compression. This makes the bike less stable at high speeds and is not desirable. With the present invention, the upper and lower pivot links can be adjusted to a non-parallel position such that the fork inclination varies slightly with respect to the head tube as the pivot links reciprocate upwardly. This slight variation in inclination can be adjusted so that the wheel base of the bicycle remains constant during the entire compression stroke of the suspension mechanism or the wheel position can be varied in some other desired fashion.

Another important feature of the present invention is the four pivot link, eight pivot point mounting mechanism for the front fork. By employing four pivot links in a generally rectangular pattern at the front of the frame assembly, the fork is held securely in place with good lateral stability and is constrained to move only in a reciprocating up and down direction and is not permitted to twist sideways with respect to the frame. This rigid four link mounting mechanism makes it possible to provide a high performance cushioning effect at the front of the vehicle without sacrificing strength and lateral stability of the steering mechanism. The eight pivot points also make the front suspension system more sensitive to small bumps and avoids sticking problems ("stiction") that are present in some front suspension systems.

The aircraft-type bearings pressed into the head tube of the bicycle eliminates the need for a standard bearing head set and saves a substantial amount of cost and weight in the fabrication of the unit. The bearing design also isolates the steerer tube from the head tube more effectively than some prior designs.

Another feature of the present invention is shown in FIG. 5. Collar 76 includes flanges 110 extending from opposite sides of the collar. A stop member 112 is welded or otherwise attached to the underside of inclined frame member 14 at the center of the frame and in arcuate alignment with flanges 110 on collar 76. When the steering tube is turned by the handle bars in either direction, flanges 110 will ultimately engage stop member 112 and prevent the handle bars from rotating past the midpoint of the frame. This steering stop eliminates the risk of damaging frame and control cables by excess rotation of the steering column.

It should be understood that the foregoing is merely representative of the preferred practice of the present invention and that various changes and modifications may be made in the embodiments described herein without departing from the spirit and scope of the present invention, which is defined in the attached claims.

I claim:

1. A front fork assembly for a bicycle or motorcycle, having a frame comprising:

a hollow head tube mounted on a front end of the frame in a generally upright position;

a hollow steerer tube rotatably mounted in the head tube and including upper and lower ends that extend out of the top and bottom ends respectively of the head tube;

an elongated resilient biasing means positioned in the steerer tube and mounted at an upper end to an upper portion of the interior of the steerer tube, the biasing means having a lower end that extends out of a lower end of the steerer tube;

a fork that supports a front wheel at a lower end thereof, the fork comprising a pair of parallel fork arms interconnected by a cross member mechanism extending between the fork arms at longitudinally spaced locations on an upper portion of the fork arms;

an upper pivot link bracket attached to the steerer tube above the head tube;

a pair of upper pivot links pivotally attached at rear ends to the upper pivot link bracket on opposite sides of the steerer tube and extending forwardly to front ends that are pivotally attached to the fork at laterally spaced locations thereon;

a lower pivot link bracket attached to the steerer tube below the head tube;

a pair of lower pivot links pivotally attached at rear ends to the lower pivot link bracket on opposite sides of the steerer tube and extending forwardly to front ends that are pivotally attached to the fork at laterally spaced locations thereon; and shock absorber fastener means for drivingly interconnecting the lower pivot links with the lower end of the resilient biasing means at a position spaced away from the position where the lower pivot links are pivotally attached to the lower pivot link bracket, such that pivotal movement of the lower pivot links by upward reciprocation of the fork causes deflection of the resilient biasing means to cushion the movement of the fork.

2. A front fork assembly as in claim 1 wherein the steerer tube includes a relatively narrower upper portion on which the steerer stem is mounted and a relatively larger diameter lower portion that provides an enlarged internal opening for housing a shock absorber.

3. A front fork assembly as in claim 2 wherein an upper end of the steerer tube is sized to accept a steerer stem thereon.

4. A front fork assembly as in claim 1 wherein the steerer tube and head tube have internal openings at lower portions thereof such that a piston shock absorber with a concentric spring thereon can be mounted in the opening in the steerer tube.

5. A front fork assembly as in claim 1 wherein the fork cross member mechanism includes upper and lower cross members slidably mounted on the fork arms, the cross members being held in position on the fork arms by releasable clamps on the cross members that releasably engage the fork arms to permit longitudinal adjustment of the cross member positions on the fork arms, the upper and lower pivot links being pivotally mounted to the fork assembly by pivotal attachment to the respective upper and lower cross members.

6. A front fork assembly as in claim 1 and further comprising outwardly extending flanges on opposite sides of a pivot link bracket and a stop member mounted on the frame in position to engage the flanges when the steerer tube is rotated through a predetermined angle in either angular direction.

7. A front fork assembly as in claim 1 wherein the steerer tube is mounted in the head tube by ball bearings that are press fitted in opposite ends of the head tube.

8. A fork assembly as in claim 1 wherein the fork is connected to the lower pivot links at a greater distance from the position wherein the pivot links are pivotally attached to the lower pivot link bracket than the resilient biasing means, such that the stroke of the fork is greater than the stroke of the resilient biasing means during upward and downward reciprocation of the fork.

9. A front fork assembly for a bicycle or motorcycle, having a frame and a steerer tube mounting mechanism for mounting a steerer tube to the frame, the front fork assembly comprising:

a hollow steerer tube rotatably mounted in the steerer tube mounting mechanism and including an exposed portion that extends axially out of the steerer tube mounting mechanism;

an elongated resilient biasing means positioned in the steerer tube and mounted at an upper end to an upper portion of the interior of the steerer tube, the biasing means having a lower end that extends out of a lower end of the steerer tube;

a fork that supports a front wheel at a lower end thereof, the fork comprising a pair of parallel fork arms interconnected by a cross member mechanism extending between the fork arms;

upper and lower pivot link brackets attached to the exposed portion of the steerer tube at longitudinally spaced locations thereon;

a pair of upper pivot links pivotally attached at rear ends to the upper pivot link bracket on opposite sides of the steerer tube and extending forwardly to front ends that are pivotally attached to the fork at laterally spaced locations thereon;

a pair of lower pivot links pivotally attached at rear ends to the lower pivot link bracket on opposite sides of the steerer tube and extending forwardly to front ends that are pivotally attached to the fork at laterally spaced locations thereon; and shock absorber fastener means for drivingly interconnecting the lower pivot links with the lower end of the resilient biasing means at a position spaced away from the position where the lower pivot links are pivotally attached to the lower pivot link bracket, such that pivotal movement of the lower pivot links by upward reciprocation of the fork causes deflection of the resilient biasing means to cushion the movement of the fork.

10. A frame and front fork assembly for a bicycle comprising:

a frame member;

a head tube mounted on a front end of the frame member in a generally upright position;

a hollow steerer tube rotatably mounted in the head tube and including an exposed portion that is axially displaced from the head tube;

the head tube and steerer tube including enlarged diameter lower portions that create an internal opening in the lower end of the steerer tube that is sufficiently large that a shock absorber can fit in the steerer tube, the upper end of the steerer tube being sized to accept a steerer stem thereon;

a shock absorber mounted in the steerer tube and attached at an upper end to an upper portion of the interior of the steerer tube, the shock absorber having a lower end that extends out of a lower end of the steerer tube, the shock absorber including both resilient and energy dissipating elements that are actuated by axial displacement of the lower end of the shock absorber with respect to the upper end of the shock absorber;

a fork that supports a front wheel at a lower end thereof, the fork comprising a pair of parallel fork arms interconnected by a cross member mechanism extending between the fork arms;

a pivot linkage mechanism pivotally interconnecting the fork with the steerer tube for upward and downward reciprocation of the fork mechanism with respect to the steerer tube; and shock absorber connector means for drivingly interconnecting the fork with the lower end of the shock absorber, such that vertical reciprocation of the fork causes actuation of the shock absorber to cushion the movement of the fork.

11. A fork assembly for a supporting a steerable wheel in a wheeled vehicle comprising:

a hollow head tube mounted on a front end of the vehicle in a generally upright position;

a hollow steerer tube rotatably mounted in the head tube and including upper and lower ends that extend out of the top and bottom ends respectively of the head tube;

an elongated resilient biasing means positioned in the steerer tube and mounted at an upper end to an upper portion of the interior of the steerer tube, the biasing means having a lower end that extends out of a lower end of the steerer tube;

a fork that supports a vehicle wheel at a lower end thereof, the fork comprising a pair of parallel fork arms interconnected by a cross member mechanism extending between the fork arms at longitudinally spaced locations on an upper portion of the fork arms;

an upper pivot link bracket attached to the steerer tube above the head tube;

a pair of upper pivot links pivotally attached at rear ends to the upper pivot link bracket on opposite sides of the steerer tube and extending forwardly to front ends that are pivotally attached to the fork at laterally spaced locations thereon;

a lower pivot link bracket attached to the steerer tube below the head tube;

a pair of lower pivot links pivotally attached at rear ends to the lower pivot link bracket on opposite sides of the steerer tube and extending forwardly to front ends that are pivotally attached to the fork at laterally spaced locations thereon; and shock absorber fastener means for drivingly interconnecting the lower pivot links with the lower end of the resilient biasing means at a position spaced away from the position where the lower pivot links are pivotally attached to the lower pivot link bracket, such that pivotal movement of the lower pivot links by upward reciprocation of the fork causes deflection of the resilient biasing means to cushion the movement of the fork.

12. A front fork assembly as in claim 11 wherein the head tube and steerer tube include lower portions that are sufficiently large in internal diameter to receive therein a piston-type shock absorber having a concentric spring thereon.

13. A front fork assembly as in claim 12 wherein an upper end of the steerer tube is sized to accept a steerer stem thereon.

14. A front fork assembly as in claim 11 wherein the fork cross member mechanism includes upper and lower cross members slidably mounted on the fork arms, the cross members being held in position on the fork arms by releasable clamps on the cross members that releasably engage the fork arms to permit longitudinal adjustment of the cross member positions on the fork arms, the upper and lower pivot links being pivotally mounted to the fork assembly by pivotal attachment to the respective upper and lower cross members.

15. A front fork assembly as in claim 11 wherein the steerer tube is mounted in the head tube by ball bearings that are press fitted in opposite ends of the head tube.

16. A fork assembly as in claim 11 wherein the fork is connected to the lower pivot links at a greater distance from the position wherein the pivot links are pivotally attached to the lower pivot link bracket than the resilient biasing means, such that the stroke of the fork is greater than the stroke of the resilient biasing means during upward and downward reciprocation of the fork.

* * * * *